United States Patent
Hsu et al.

(10) Patent No.: US 8,518,280 B2
(45) Date of Patent: Aug. 27, 2013

(54) BRITTLE NON-METALLIC WORKPIECE WITH THROUGH HOLE AND METHOD FOR MAKING SAME

(75) Inventors: Mu-Chi Hsu, Taipei Hsien (TW); Vladimir Stepanovich Kondratenko, Moscow (RU)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1133 days.

(21) Appl. No.: 12/145,467

(22) Filed: Jun. 24, 2008

(65) Prior Publication Data

US 2009/0162606 A1 Jun. 25, 2009

(30) Foreign Application Priority Data

Dec. 21, 2007 (CN) .......................... 2007 1 0203349

(51) Int. Cl.
| | |
|---|---|
| B23K 26/14 | (2006.01) |
| B23K 26/36 | (2006.01) |
| C03B 33/09 | (2006.01) |
| C03B 33/10 | (2006.01) |
| B23K 26/00 | (2006.01) |
| B23K 26/40 | (2006.01) |

(52) U.S. Cl.
CPC ............. *C03B 33/093* (2013.01); *C03B 33/102* (2013.01); *C03B 33/09* (2013.01); *B23K 26/0057* (2013.01); *B23K 26/4075* (2013.01)
USPC ................ 216/31; 219/121.67; 83/15; 83/16; 216/65; 264/1.37; 264/482

(58) Field of Classification Search
CPC .... C03B 33/093; C03B 33/102; C03B 33/09; B23K 26/0057; B23K 26/4075
USPC ............... 83/16, 15; 216/31; 219/121.67, 219/121.72; 264/1.37, 482
See application file for complete search history.

(56) References Cited

U.S. PATENT DOCUMENTS

| | | | | |
|---|---|---|---|---|
| 5,609,284 | A * | 3/1997 | Kondratenko | 225/1 |
| 6,744,009 | B1 * | 6/2004 | Xuan et al. | 219/121.67 |
| 6,829,910 | B1 * | 12/2004 | Hsieh et al. | 65/112 |
| 7,642,483 | B2 * | 1/2010 | You et al. | 219/121.68 |
| 8,051,679 | B2 * | 11/2011 | Abramov et al. | 65/112 |
| 2003/0051353 | A1 * | 3/2003 | Gartner et al. | 33/18.1 |
| 2003/0146197 | A1 * | 8/2003 | Jeon | 219/121.72 |
| 2003/0201261 | A1 * | 10/2003 | Kang et al. | 219/121.72 |

(Continued)

FOREIGN PATENT DOCUMENTS

| | | |
|---|---|---|
| CN | 1939636 A | 4/2007 |
| CN | 1991484 A | 7/2007 |
| JP | 6-84855 A | 3/1994 |
| JP | 7-16769 A | 1/1995 |
| JP | 2005-263578 A | 9/2005 |
| TW | 521020 | 2/2003 |
| TW | 536438 | 6/2003 |

*Primary Examiner* — Lan Vinh
*Assistant Examiner* — David Kaufman
(74) *Attorney, Agent, or Firm* — Altis Law Group, Inc.

(57) ABSTRACT

An exemplary brittle non-metallic workpiece (80) defines a through hole (82). An inner surface (822) for forming the through hole has no microcracks and burrs. A method for making a through hole in a brittle non-metallic substrate (50) is also provided. The method includes as follows: forming an enclosing sketched etch (66) engraved into a brittle non-metallic substrate with a given depth (H) from a surface of the brittle non-metallic substrate; placing a cooling object (74) on an excess portion (68) inside the enclosing sketched etch (66); and extending the enclosing sketched etch through the brittle non-metallic substrate.

6 Claims, 6 Drawing Sheets

(56) References Cited

U.S. PATENT DOCUMENTS

| | | | |
|---|---|---|---|
| 2006/0151450 A1* | 7/2006 | You et al. | 219/121.67 |
| 2007/0164072 A1* | 7/2007 | Nishio | 225/93.5 |
| 2009/0159580 A1* | 6/2009 | Hsu et al. | 219/121.68 |
| 2010/0078417 A1* | 4/2010 | Abramov et al. | 219/121.72 |
| 2010/0089882 A1* | 4/2010 | Tamura | 219/121.69 |
| 2010/0102042 A1* | 4/2010 | Garner et al. | 219/121.68 |

* cited by examiner

BRITTLE NON-METALLIC WORKPIECE WITH THROUGH HOLE AND METHOD FOR MAKING SAME

BACKGROUND OF THE INVENTION

1. Field of the Invention

The present invention generally relates to brittle non-metallic workpieces with through holes and methods for making same.

2. Discussion of the Related Art

For various purposes, a through hole is usually defined in workpieces made of glass or other brittle non-metallic materials. A typical process of making a hole in a glass substrate will be described using a conventional method as example. Firstly, a grinding machine including at least one grindstone is provided. The grindstone is substantially a hollow cylinder with two openings. A contour of the grindstone corresponds to that of the through hole. Secondly, the grindstone is placed on a first predetermined position of a first surface of the glass substrate. The grindstone is driven by a driving device, such as a motor, to gradually grind into the glass substrate. When a grinding crack extends through a half thickness of the glass substrate, the grindstone stops grinding the glass substrate. Thirdly, the glass substrate is turned over, and the grindstone is placed on a second predetermined position corresponding to the first predetermined position. Then, the grindstone is driven by the driving device, to grind into the glass substrate until the grinding crack extends through the glass substrate. An excess portion inside the grinding crack is separated and removed from the glass substrate, thereby forming a through hole in the glass substrate.

However, since the through hole of the glass substrate is formed via grinding, an inner surface for forming the through hole has many burrs and microcracks. The microcracks result in weakening the strength of the glass substrate.

Therefore, a brittle non-metallic workpiece with a through hole which has no aforementioned shortcomings is desired. A new method for such workpiece is also desired.

SUMMARY

In one aspect, an exemplary brittle non-metallic workpiece defines a through hole. An inner surface for forming the through hole has no microcracks and burrs.

In another aspect, a method for forming a through hole in a brittle non-metallic substrate is also provided. The method includes steps as follows: forming an enclosing sketched etch engraved into a brittle non-metallic substrate with a given depth from a surface of the brittle non-metallic substrate; placing a cooling object on an excess portion inside the enclosing sketched etch; extending the enclosing sketched etch through the brittle non-metallic substrate.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present brittle non-metallic workpiece with through hole and method for making same. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present brittle non-metallic workpiece with a through hole in detail.

An exemplary method for making the brittle non-metallic workpiece with a through hole will now be described as follows. For exemplary purposes, a method for forming a through hole in a workpiece made of glass is described. The method includes the following steps: (1) An enclosing sketched etch is engraved into a glass substrate with a given depth from a surface of the glass substrate is formed; (2) A cooling object is placed on an excess portion inside the sketched etch; (3) The enclosing sketched etch extends through the glass substrate.

Figure 1:
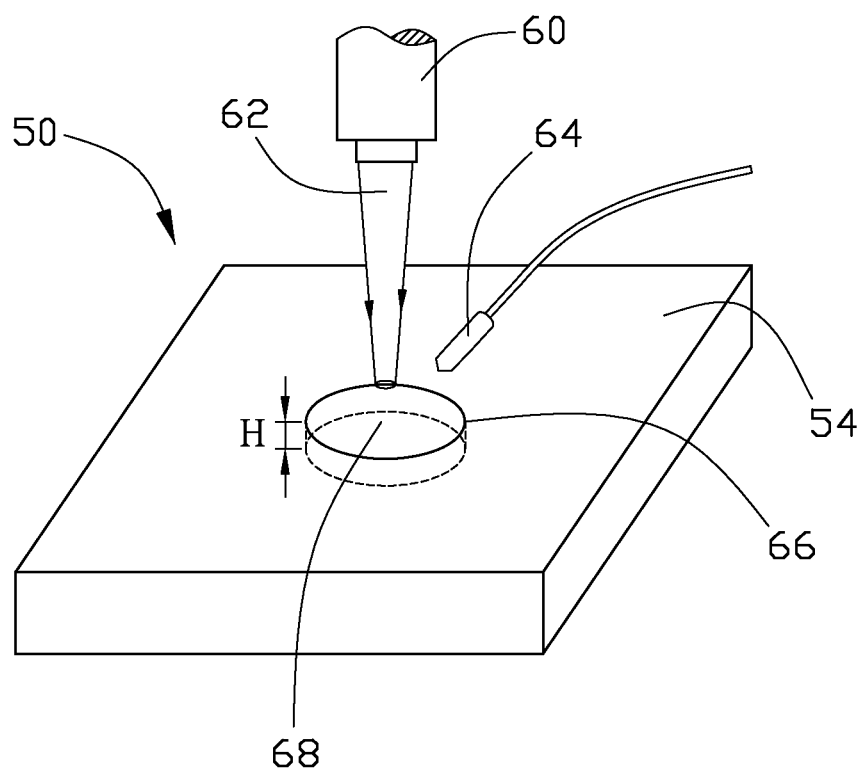
FIG. 1 illustrates a first step in the practice of the present method in accordance with an exemplary embodiment, showing an enclosing sketched etch is formed on a brittle non-metallic substrate.

Referring to FIG. 1, in the first step, a glass substrate 50 having a surface 54 is provided. A laser producer 60 is provided to emit a laser beam 62 on the surface 54 along a predetermined line. A nozzle 64 of a cooling unit (not shown) follows the laser beam 62 spraying a coolant onto heated points along the predetermined line, so that a sketch etch is engraved in the glass substrate 50 along the predetermined line due to expansion and contraction by temperature differences. In this embodiment shown in FIG. 1, the predetermined line forms a closed circular figure, but maybe be other closed figure in other embodiments. When the laser beam 62 is moved along the predetermined line and an enclosing sketched etch 66 develops from the predetermined line, an excess portion 68 inside the enclosing sketched etch 66 is formed.

In the first step, heating a region around the predetermined line caused by the laser beam 62 produces a thermal stress and subsequent cooling the heated region via the coolant induces tensile stresses in a surface layer of the glass substrate 50, the region surrounding the sketched etch expands when heated and contracts when cooled. Thus, the sketched etch extends from the surface of the glass substrate 50 partially into the glass substrate 50. The sketched etch extends along the predetermined line until the enclosing sketched etch 66 is formed.

A needed depth H of the enclosing sketched etch 66 depends on several factors, such as a size of a beam spot of the laser beam 62, moving speed of the laser beam 62, and the nozzle 64. A temperature of the laser beam 62 is controlled to be below a melting point of the glass substrate 50 by controlling a strength of the laser beam 62. The coolant sprayed from the nozzle 64 may be one of cold water, helium, nitrogen, and carbon dioxide. Alternatively, the enclosing sketched etch 66 may also be produced by other cutting methods, such as using a diamond cutter.

In the second step, a temperature of the region surrounding the sketched etch 66 is changed rapidly. There are many methods for rapidly changing the temperature. For example, three methods are described as follows.

Figure 2:
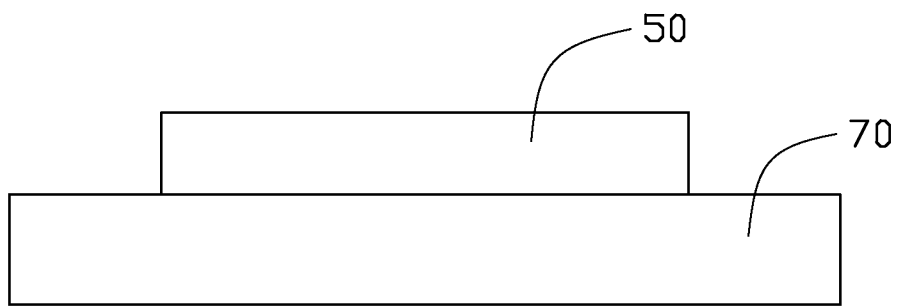
FIG. 2 illustrates a second step in the practice of the method of FIG. 1, showing a region surrounding the enclosing sketched etch is heated by a heating device.
Figure 3:
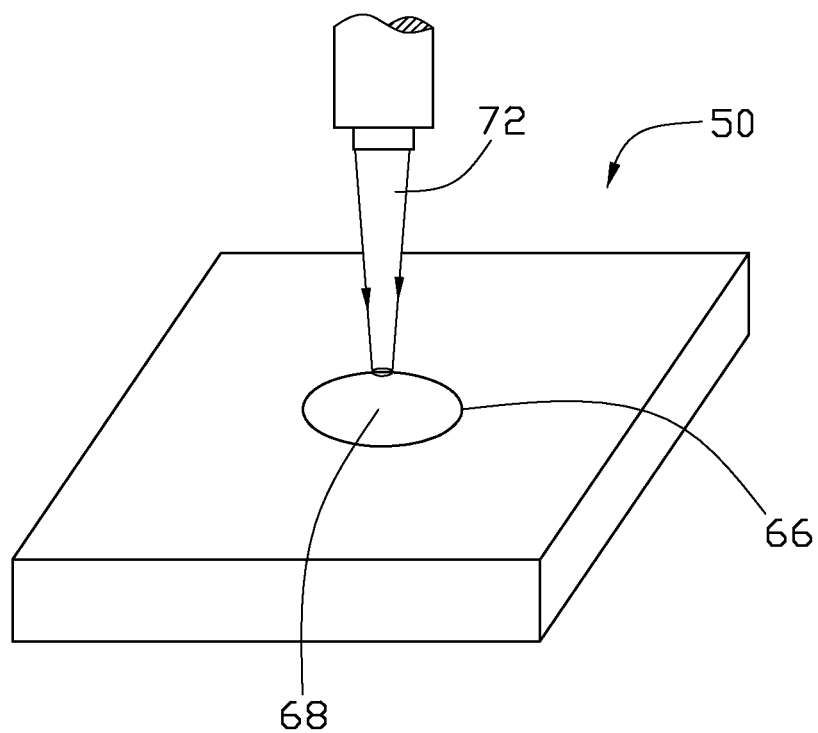
FIG. 3 illustrates a second step in the practice of the method of FIG. 1, showing a region surrounding the enclosing sketched etch is heated by a laser beam.

A first method of the second step is performed by rapidly cooling the region surrounding the sketched etch 66 after heating. Referring to FIG. 2, firstly, the glass substrate 50 is heated by a heating device 70 until a temperature of the glass substrate 50 reaches about 60 degrees Celsius (° C.). Alternatively, the glass substrate 50 or the region surrounding the enclosing sketched etch 66 may be heated using infrared rays or a laser beam. Referring to FIG. 3, the region surrounding the enclosing sketched etch 66 may also be heated by a laser beam 72. A temperature of the laser beam 72 is in a range from about 200 degrees Celsius (° C.) to about 300 degrees Celsius (° C.). A power density of the laser beam 72 is smaller than the power density of the laser beam 62.

Figure 4:
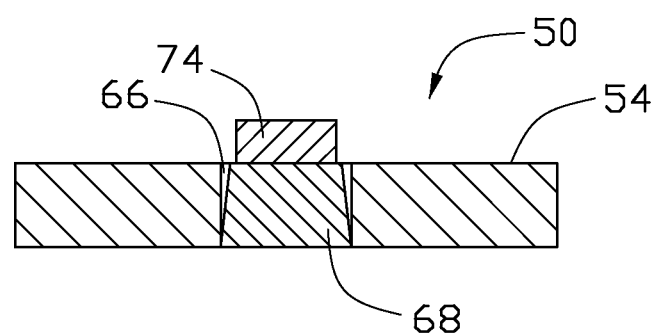
FIG. 4 illustrates a second step in the practice of the method of FIG. 1, showing a region surrounding the enclosing sketched etch is cooled via a cooling object.

Secondly, referring to FIG. 4, a cooling object 74 is placed on the excess portion 68 and inside the sketched etch 66. The excess portion 68 is cooled rapidly. Therefore, a temperature of the region surrounding the sketched etch 66 is changed, thereby inducing tensile stresses in a surface layer of the glass substrate 50. The region surrounding the sketched etch 66 expands when heated and contracts when cooled, as a result, the enclosing sketched etch 66 extends from the surface of the glass substrate 50 partially into the glass substrate 50. In alternative embodiments, the cooling object 74 may cover the excess portion 68, and the material adjacent to the closed enclosing sketched etch 66 is cooled rapidly.

A process for making the cooling object 74 with low temperature comprises the following steps. Firstly, a metal block is submerged into liquid helium. A temperature of the liquid helium is approximately 170 degrees Celsius (° C.) below. Next, when the metal block is submerged in the liquid helium for a predetermined time, the metal block is then taken out of the liquid helium. As such, the cooling object 74 is obtained. Alternatively, the metal block may be other members with perfect transcalent properties. The cooling object 74 may be other low temperature solids or liquids.

A second method of the second step is performed by placing a cooling object directly on the excess portion 68. A temperature of the cooling object is lower than that of the cooling object 74. The region surrounding the enclosing sketched etch 66 is rapidly cooled, and the enclosing sketched etch 66 then extends through the glass substrate 50.

A third method of the second step is performed by heating the enclosing sketched etch 66 by a high energy laser beam, and then by spraying a coolant onto the heated point.

Referring further to FIG. 4, in a third step, the enclosing sketched etch 66 extends from the surface of the glass substrate 50 partially into the glass substrate 50 until the enclosing sketched etch 66 extends through the glass substrate 50. Thus, the excess portion 68 is separated from the glass substrate 50. A splitting principle of the glass substrate 50 will now be described. In engineering application, glass is a brittle non-metallic material. Glass will split when a formula of $K_I = K_{IC}$ is satisfied in the glass. In the above formula, $K_I$ is a stress factor dependent on the depth H of the enclosing sketched etch 66 and external stresses. $K_{IC}$ is a splitting toughness of the material, and $K_{IC}$ is relative to the organization of the material. When the temperature of the region surrounding the enclosing sketched etch 66 is rapidly changed, an external stress is thus produced. The external stress is dependent on a varying value of the temperature and the thermophysical properties of the glass. The external stress is increased gradually, and the stress factor $K_I$ is also increased. When the stress factor $K_I$ is equal to the splitting toughness $K_{IC}$, the enclosing sketched etch 66 will extend to the surface opposite to the surface 54 of the glass substrate 50. At last, the enclosing sketched etch extends through the glass substrate 50.

Figure 5:
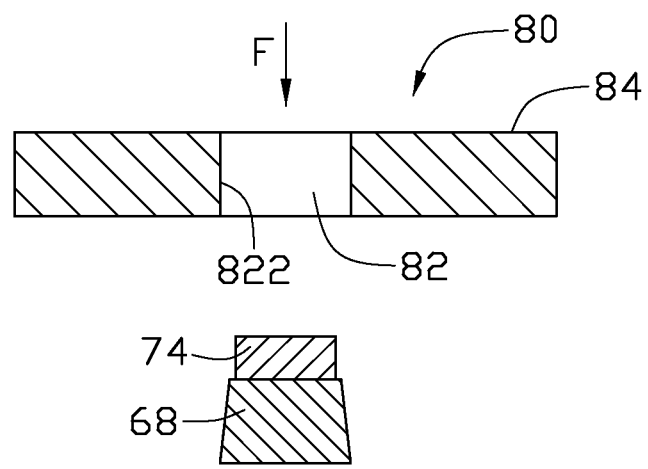
FIG. 5 illustrates a third step in the practice of the method of FIG. 1, showing an excess portion inside the enclosing sketched etch is separated from the brittle non-metallic substrate.
Figure 6:
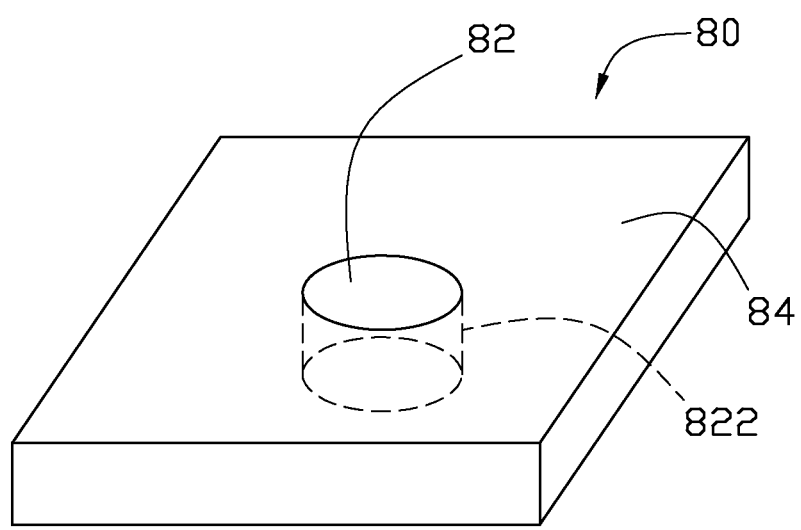
FIG. 6 is an isometric view of a brittle non-metallic workpiece with a through hole in accordance with an exemplary embodiment of the present invention.

Referring to FIG. 5, an external force F is applied to the cooling object 74 and the excess portion 68, the excess portion 68 is separated and removed from the glass substrate 50. Thus, referring to FIG. 6, a desired glass workpiece 80 is obtained. The glass workpiece 80 with a circular through hole 82 has a flat surface 84. The through hole 82 extends from the flat surface 84 to a surface opposite to the flat surface 84. A roughness of an inner surface for forming the through hole 82 is equal to or less than 40 nanometers. The roughness of the inner surface can be even equal to or less than 17 nanometers, thus the inner surface for forming the through hole 82 has no microcracks and burrs. Alternatively, the surface 84 may be surface with other shapes such as a curved surface and a slanted surface. The through hole 82 is not limited to a circular hole, the through hole can also be other shapes such as elliptic, irregular and polygonal.

In order to improve a quality of the glass workpiece 80, a sharp edge portion for connecting an inner surface 822 for forming the through hole 82 and the flat surface 84 may be chamfered. As such, a user's hands will not be cut by the edge portion.

In the above described method for making the glass workpiece 80, the enclosing sketched etch 66 extends through the glass substrate 50 because of rapidly changing of the temperature. There is no mechanical force applied on the glass substrate 50, so that the splitting surface of the enclosing sketched etch 66 is in an original sate of the material. Therefore, the inner surface 822 for forming the through hole 82 of the glass workpiece 80 is a lucent surface with no microcracks and burrs. A roughness of the inner surface 822 is equal to or less than 40 nanometers and can even reach or less than 17 nanometers.

The workpiece 80 may be made of non-metallic material selected from the group consisting of sapphire, Irish diamond, chinaware, and monocrystalline silicon.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for making a through hole in a brittle non-metallic workpiece, comprising:
    forming an enclosing sketched etch engraved into a brittle non-metallic substrate with a given depth from a surface of the brittle non-metallic substrate by a first laser beam and a coolant following the laser beam;
    heating a region surrounding the enclosing sketched etch by a second laser beam, a power density of the second laser beam being smaller than the power density of the first laser beam;
    changing a temperature of the region surrounding the enclosing sketched etch rapidly by placing a cooling object on an excess portion inside the enclosing sketched etch; and extending the enclosing sketched etch through the brittle non-metallic substrate.

2. The method as claimed in claim 1, wherein the brittle non-metallic workpiece is made of non-metallic material selected from the group consisting of glass, sapphire, Irish diamond, chinaware, and monocrystalline silicon.

3. The method as claimed in claim 1, wherein after the through hole is formed, a sharp edge portion for connecting an inner surface for forming the through hole and the surface of the brittle non-metallic workpiece is chamfered.

4. The method as claimed in claim 1, wherein the enclosing sketched etch is circular, and cooperatively formed by the first laser beam and a coolant following the first laser beam.

5. The method as claimed in claim 1, wherein the cooling object is formed by a metal block submerged into liquid helium.

6. The method as claimed in claim 1, wherein a temperature of the second laser beam is in a range from about 200° C. to about 300° C.

* * * * *